Jan. 22, 1952  M. VAN VALKENBURGH ET AL  2,583,245
TIMING DEVICE
Filed Aug. 8, 1949  2 SHEETS—SHEET 1
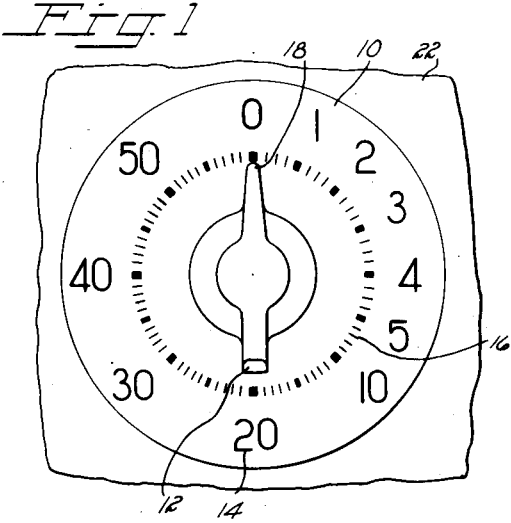
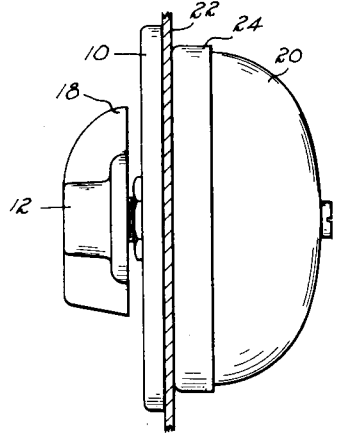
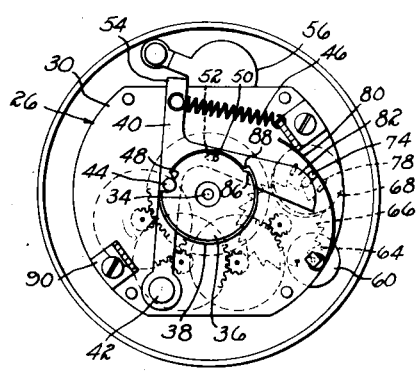
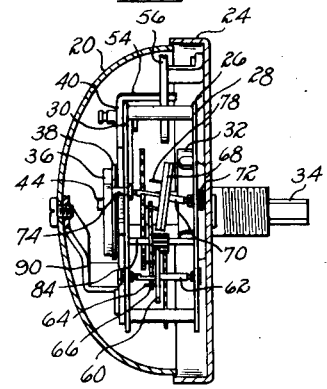
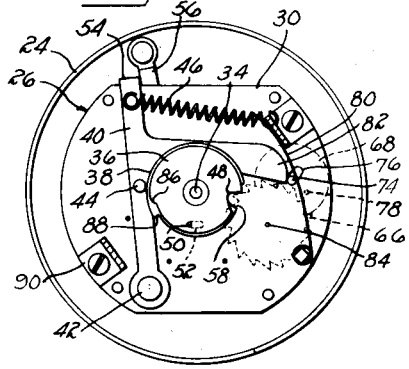
Inventors
MERRITT VAN VALKENBURGH
LAWRENCE J. LAVIANA
By
Lindsey Prutzman & Just
Attorneys Jan. 22, 1952   M. VAN VALKENBURGH ET AL   2,583,245
TIMING DEVICE Filed Aug. 8, 1949   2 SHEETS—SHEET 2

Inventors
MERRITT VAN VALKENBURGH
LAWRENCE J. LAVIANA

By
Lindsey, Prutzman & Just
Attorneys

Patented Jan. 22, 1952

2,583,245

UNITED STATES PATENT OFFICE 2,583,245

TIMING DEVICE

Merritt Van Valkenburgh, Upper Nyack, N. Y., and Lawrence J. Laviana, Kensington, Conn., assignors to M. H. Rhodes Incorporated, Hartford, Conn., a corporation of Connecticut Application August 8, 1949, Serial No. 109,114

7 Claims. (Cl. 161—1)

This invention relates to improvements in timing devices, and more particularly, to such devices known as interval timers. Interval timers usually comprise clockwork mechanisms embodied in devices for measuring elapsed periods or intervals of elapsed time.

Timers of the type referred to are generally used to measure elapsed periods of time of various lengths regardless of whether the period is only a fraction of a minute or a substantial period of many minutes or even hours of time. A number of popular forms of timers of this nature now available have a maximum range of one hour since there is a great demand for timers of this range of time intervals. The present invention, however, is applicable to timers having even greater ranges than one hour.

In using timers of this nature for measuring relatively short intervals of time such as a fraction of one minute, or even up to a five minute interval for example, it has been found that measurement of such relatively short intervals cannot be made as accurately as intervals of considerably greater length. This is in part due to the fact that tolerances encountered in manufacturing timers are such that a high degree of accuracy cannot usually be expected when measuring relatively small intervals of time except in regard to timers of a very precise and expensive nature.

It has been found that timers comprising a clockwork mechanism driven by a source of power such as a coiled spring, when operating at a relatively high rate of speed, appreciably overcome inaccuracies caused by manufacturing tolerances and are much more accurate than when the mechanisms operate at slower speeds. It is therefore an object of the present invention to improve the accuracy of interval timers for measuring a general, over-all range of intervals of time by providing a dual-range timing mechanism operated by a power driven clockwork mechanism which is operated at a fast rate of speed while measuring relatively small intervals of time and at a slower rate of speed while measuring relatively larger intervals of time.

It is another object of the invention to include means within the timing mechanism which will automatically shift the speed control mechanism at a specific, predetermined position within the total time measuring range of the timing mechanism and setting means thereof.

It is a further object of the invention to effect such change in the rate of speed of the timing mechanism by embodying therein speed regulating means comprising an escape wheel and a pallet member movable into and out of engagement with said escape wheel, the time train of the timing mechanism operating at a fast rate of speed when the escape wheel and pallet member are disengaged and at a slower rate of speed when the escape wheel and pallet member are in engagement with each other.

It is still another object of the invention to adapt these principles to a timing mechanism to cause the pallet member to disengage the escape wheel after a predetermined interval of time has been measured by the timing mechanism and thereafter permit the time train to run free of any impedance or control by the pallet member, whereby the time train then runs at a very rapid rate of speed and provides sufficient power for a short interval of time to operate, for example, a manipulating member for performing an operation relative to an associated mechanism such as operating a valve or a switch, moving a member, or the like.

Details of these objects and of the invention, as well as other objects thereof, are set forth in the following specification and illustrated in the drawings comprising a part thereof.

In the drawings:

Fig. 1 is a front vertical elevation of a dual-range interval timer mechanism embodying the principles of the present invention.

Fig. 2 is a side elevation of Fig. 1.

Fig. 3 is a rear vertical elevation of the timing mechanism shown in Fig. 1.

Fig. 4 is a sectional side elevation of the mechanism shown in Fig. 3.

Fig. 5 is similar to Fig. 3 but showing certain elements of the mechanism in different operative positions.

Figure 6:
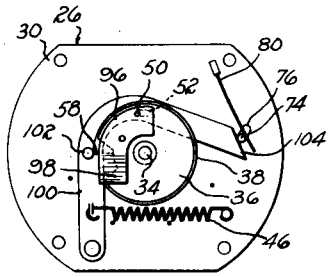
Fig. 6 is a rear elevation of a somewhat modified embodiment of interval timer mechanism adapted for functions additional to those for which the mechanism shown in Fig. 5 is specifically intended.

Referring to Fig. 1, the interval timer mechanism illustrated therein comprises a dial 10 and a setting knob 12 rotatably mounted relative to the center of said dial, the dial comprising a plurality of indicia 14 and a circular arrangement of graduations 16. In order that more accurate measurement of short intervals of time may be made, up to some selected arbitrary maximum commensurate with the characteristics of the timer such for example as five minutes, the indicia and graduations for measuring such short intervals are spaced apart a greater distance than the graduations and indicia for measuring longer intervals of time between, for example, five and sixty minutes.

During the measurement of any selected short interval of time up to the exemplary limit of five minutes, the mechanism operates at a fast rate of speed to return the pointer 18 of the setting knob 12 from a selected setting to zero. When the pointer reaches zero, mechanism is caused to operate which will effect a signal such, for example, as the sounding of bell 20. Due to the fast rate of speed of the timing mechanism during the measuring of short intervals, the operation of the mechanism will be highly accurate, and in view of the wide spacings of the graduations and indicia on the dial for measuring such short intervals, said intervals may also be set accurately by the knob 12 to a high degree of accuracy.

As stated in the foregoing, it is generally during the measurement of short intervals of time that inaccuracies in the operation of a timing mechanism are most perceptible and effective to produce an inaccurate measurement. Thus, for measuring intervals of time between, for example, five minutes and 60 minutes, timing mechanism of the type illustrated herein will operate with a reasonably high degree of accuracy for measuring such so-called longer intervals of time, and while measuring such longer intervals, the mechanism is operated at a relatively slow rate of speed. Accordingly, the indicia and graduations for indicating such longer intervals of time are spaced more closely together on the dial than those for measuring short intervals of time, less than the exemplary and arbitrary short interval maximum of five minutes.

In the exemplary dual-range timing mechanism illustrated and described herein, the fast speed has been arbitrarily selected so as to be five times faster than the slow speed of the mechanism. This difference may, of course, be varied to suit any specific situation with which the timing mechanism may be used. The graduations and indicia on the dial 10 from zero to five minutes and from five minutes to 60 minutes have been appropriately arranged in accordance with said difference between the fast and slow speeds of the mechanism.

The timing mechanism may be mounted on any suitable supporting device such, for example, as a panel 22 of either a domestic or industrial appliance. The dial 10 may be secured to one side of said panel and a mounting frame 24 is secured to the other side thereof. A bell 20 preferably telescopes within the rear of the mounting frame 24 but the peripheries thereof are relatively spaced so as not to interfere with the sounding of the bell. In this embodiment of the invention, the bell 20 also serves as an enclosure for the timing mechanism.

The mechanism 26 comprises a time train composed of a plurality of intermeshing wheels and pinions supported by staffs pivotally mounted between and perpendicular to a pair of spaced frame plates 28 and 30. The time train is driven by simple power means such as a coil spring 32 which is wound around a winding arbor 34 to which the setting knob 12 is secured at one end. The other end of the winding arbor has fixed thereto a cam or timing disc 36. Said end of the arbor also rotatably supports a second timing disc 38.

Pivotally supported at one end by the frame plate 30 is an irregularly shaped lever 40 somewhat resembling a T. The end of one leg of the lever is pivoted to the frame plate 30 by shoulder stud 42. Fixed to the lever intermediate two of the ends thereof is an upstanding pin 44. Spring 46 normally biases the lever in a direction to maintain the pin 44 against either the periphery of disc 38 or against the walls of notches 48 in said discs 36 and 38 when said notches are aligned as shown in Fig. 3. This is the position the notches 48 and pin 44 occupy when the knob 12 is set in zero position as indicated in Fig. 1.

The periphery of disc 38 extends slightly beyond that of disc 36, and disc 38 is pivotally movable relative to disc 36 for a limited amount controlled by pin 50 which is fixed to disc 36 and extends through a short arcuate slot 52 formed in disc 36. This exemplary type of timer is that which, in measuring short intervals of time, requires the setting knob 12 to be moved past the desired interval of time to be measured, in clockwise direction as viewed in Fig. 1, and then moved backward in counter-clockwise direction, until the exact setting for the pointer 18 is reached. This manipulation is for purposes of providing a sharp drop-off for the pin 44 relative to the discs 36 and 38 at the end of a desired elapsed period of time, as is described hereinafter.

To describe a setting operation of the herein illustrated dual-timing mechanism, assume that a setting of three minutes is to be made. The pointer 18 is first moved past the indicium 3. Such movement is in clockwise direction as viewed in Fig. 1 but in counter-clockwise direction as viewed in Fig. 3 since the latter is a rear view of Fig. 1. When the arbor 34 is first moved in counter-clockwise direction in Fig. 3, the disc 36 which is fixed to said arbor will be moved counter-clockwise and such movement will be relative to the disc 38 until the pin 50 of disc 36 engages the left hand end of the slot 52 shown in Fig. 3. The discs will then move together in counter-clockwise direction. During such movement, the sloping uppermost edge of notch 48 in disc 36 as shown in Fig. 3 will engage pin 44 and cam said pin to move it to the left, the upper end of lever 40 also being moved to the left. The upper end of lever 40 is provided with a right-angled projection 54 which engages a clapper 56 by which a bell 20 is sounded.

After being moved out of the notches 48 of the discs, the pin 44 will ride on the periphery of disc 38. When the pointer 18 is moved past the indicium 3 on the dial and then moved backward, counter-clockwise in Fig. 1, but clockwise in Fig. 3, to dispose the pointer 18 on the graduation of indicium 3, such clockwise movement of disc 36 will take place while disc 38 remains stationary until the pin 50 is disposed in the end of the slot 52 in which it is shown in Fig. 3. Continued clockwise movement will move the discs simultaneously but by this time, the notch 48 of disc 38 will not be in exact registry with the notch 48 of disc 36. The notch 48 of disc 38 is provided with a sharp radial edge 58 which overlaps the notch 48 of disc 36 as shown in Fig. 5.

When a setting has been made with the knob 12 and it is released the mainspring 32 of the mechanism will cause the knob 12 to be moved counter-clockwise in Fig. 1 and clockwise in Figs. 3 and 5, such movement being governed by the speed at which the time train operates. Thus, when the pointer 18 reaches zero, the pin 44 of lever 40 will drop off of the corner of disc 38 defined by the sharp radial edge 58 and cause the upper end of the lever 40 to be moved quickly toward the right to assume the position thereof shown in Fig. 3 and, while so moving, strike the clapper 56 and impinge the same against the bell 20 to effect a signal by sounding the bell 20.

As has been stated above, when the timing mechanism is used to measure short intervals of time, the mechanism travels at a fast rate of speed. Said rate of speed may, if needed, be controlled by any suitable means such as a relatively lightweight retarding member 60 comprising a disc mounted on a staff 62 which is pivotally supported at its ends by bearings supported by frame plates 28 and 30. The disc of the member 60 is provided with a pair of spaced pallet pins 64 which engage the teeth of an escape wheel 66 which is driven by the time train. The moment of inertia of the disc or member 60 may be varied in order to vary the speed at which the time train and, consequently, the timing mechanism operates. If the disc or the member 60 is made so as to be quite light in weight, the rate of speed of the time train will be quite rapid, and in most interval timers of this nature, more rapid than the rate at which the average clock or watch operates. This is due to the frequency of oscillation of the retarding member 60 being much higher than that of the balance wheel of the average watch or clock.

As has also been stated above, when the timing mechanism is used to measure relatively long intervals of time, that is for example, in excess of five minutes, the timing mechanism operates at a slow rate of speed. The rate is made slow relative to the fast rate by moving into engagement with the escape wheel 66 a suitable pallet member 68 which, in the example shown herein, is disc-like and is supported by a staff 70 which is pivotally supported at one end by a bearing 72 fixed relative to frame plate 28 and at the other end by a shiftable bearing 74 slidably mounted within a guide slot 76 formed in frame plate 30. It will thus be seen that the staff 70 may be tilted either toward or away from the toothed periphery of escape wheel 66 so as to permit the pallet pins 78 of the pallet member 68 to be moved so as to engage or not engage the teeth of the escape wheel 66. The bearing 74 is normally biased by any suitable means such as a preferably light spring 80 in a direction to dispose the staff 70 so that the pallet pins 78 of pallet member 68 engage the teeth of the escape wheel 66.

While the mechanism is operating at fast speed to measure short intervals of time, a cam arm 82, fixed to lever 40, engages the outer end of bearing 74 in such a manner as to hold the same shifted to its position wherein the pallet pins 78 do not engage the teeth of the escapement wheel 66. Under these circumstances, the operation of the time train is not affected by the retarding influence of pallet member 68.

When the mechanism is used to measure so-called long intervals of time in excess of five minutes, for example, the pallet member 68 is moved into engagement with the escape wheel 66 under the influence of spring 80 moving the shiftable bearing 78 in the proper direction. Such movement of the bearing 74 is effected by the lever 40 being moved to the left as viewed in Figs. 3 and 5, carrying cam arm 82 of the lever therewith and causing the outer end of said arm to disengage the bearing 74 sufficiently to permit it to move toward the pivot of the escape wheel, the slot 76 which guides said bearing being radially disposed with respect to the axis of the staff 84 of the escape wheel 66.

The shifting of bearing 74 and the aforementioned movement of the lever to the left in Figs. 3 and 5 at the predetermined arbitrary position of the setting knob 12, selected in this exemplary timer at the five minute indicium, is affected by additional notches defined by shoulder 86 on disc 36 and shoulder 88 on disc 38. The outer corner of shoulder 86 is somewhat rounded so that when said discs are moved counter-clockwise as viewed in Figs. 3 and 5 while effecting the setting of a long period of time, in excess of five minutes, the rounded shoulder 86 of disc 36 will engage pin 44 ahead of shoulder 88 on disc 38. However, when the discs are moving clockwise in timing direction as distinguished from setting direction, the sharp radial edge of shoulder 88 will trail rounded shoulder 86 and afford a sharp drop-off for pin 44 when the timing disc and setting knob 12 reach during timing movement the predetermined position arbitrarily selected at the five minute interval on the dial.

Assuming that the timing mechanism is used to measure a so-called long interval of time of twenty minutes, for example, the knob 12 will be moved in setting direction and will cause the discs 36 and 38 to be moved counter-clockwise in setting direction as viewed in Figs. 3 and 5. During such movement, the pin 44 of lever 40 will be disposed on the outermost periphery of disc 38 as shown in Fig. 5. When the discs are moving clockwise in Fig. 5 during timing movement thereof, the lever 40 will be held in the position shown in Fig. 5. In this position the cam arm 82 will permit the pallet member 68 to engage the escape wheel 66. When the five-minute interval is reached, the pin 44 will drop off of the edge of the shoulder 88 of disc 38 and impart movement to the lever 40 toward the right in Fig. 5, whereupon the cam arm 82 will engage the shiftable bearing 74 and move it away from the staff 84 of the escape wheel, against the influence of spring 80, to the position of said bearing shown in Fig. 3, thus disengaging the pallet member from the escape wheel. Such movement of lever 40, in this embodiment, will also actuate clapper 56 to sound the bell 20. The time train will thereafter operate at its fast rate which is much more rapid than the slow rate of speed, causing the timing discs 36 and 38 to move more rapidly, as well as the knob 12.

When the pointer 18 reaches the zero position, the shoulder defined by the sharp radial edge of the shoulder 88 of the disc 38 will be disposed adjacent the pin 44 and permit the pin to drop off of the sharp corner defined by radial edge 58 of disc 38 into notches 48 of the timing discs, said notches then being substantially aligned. This will cause the lever 40 to again move to the right to its position shown in Fig. 3, due to the biasing influence of spring 46, and impinge the clapper 56 against bell 20. For convenience, said bell may be suitably supported by bracket 90 which may be supported by any convenient part of the mechanism such as frame plate 30. After the signal has been made by the bell, movement of the mechanism is stopped after a few seconds of time by any suitable means, not shown, such as a finger fixed to arbor 34 engaging a fixed stop secured, for example, to one of the frame plates 28 or 30.

Figure 7:
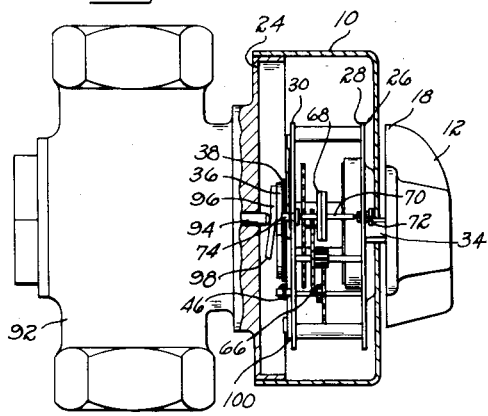
Fig. 7 is a side elevation, partly in section, of a valve operated by the timing mechanism shown in Fig. 6.

In the embodiment of the invention shown in Figs. 6 and 7, it is contemplated that, either in addition to or without sounding a signal such as ringing the bell 20, mechanism of the type comprising the present invention may be utilized to perform other useful operations relative to associated mechanism. For example, there is illustrated in Fig. 7 a valve 92 which is operable by an actuating member 94 movable, for example, in an axial direction. The mounting frame 24 of the timer may be fixed to the valve 92 as illustrated in Fig. 7 so as to dispose the timing mechanism so that it can actuate member 94.

Fixed to the outer timing disc 36 is any convenient operating means such as a curved cam 96. The portion of the cam which is fixed to the timing disc 36 is preferably flat and parallel to the disc, and one end 98 thereof extends away from the plane of the disc 36 as shown in Fig. 7. Thus, the timing mechanism may be arranged to operate so that when the setting knob 12 reaches zero, for example, the cam 96 will be disposed adjacent the actuating member 94 as shown in Fig. 7. When this occurs, the L-shaped arm 100, which functions similarly to the lever 40 in the embodiment shown in Figs. 1 through 5, will be moved to the right as shown in Fig. 6 as a result of the pin 102 thereon dropping off of the shoulder 58 of cam 38.

It will be seen that the right hand end of arm 100 has a cam surface 104 which functions similarly to the cam arm 82 of lever 40. Movement of cam 104 relative to shiftable bearing 74 will disengage the pallet member 68 from the escape wheel 66. In this embodiment of the invention, it may be desirable to omit the retarding member 60 illustrated in the embodiment of Figs. 1 through 5. If the retarding member is omitted, disengagement of the pallet member 68 from the escape wheel 66 will permit the mechanism to run entirely free from any retarding effect, and such movement therefore will be at a very rapid rate compared to that at which the mechanism operates when the pallet member engages the escape wheel. Such free running of the time train will cause the timing disc 36 and end 98 of the cam 96 thereon to be moved very rapidly. The kinetic energy of the free rapid movement of the mechanism will provide a relatively great amount of force which will be imparted to the end 98 of the cam in order to effect movement of the actuating member 94 of the valve to either open or close the valve, depending upon the manner in which the member 94 functions. After the cam end 98 has moved sufficiently to actuate the valve member 94, the timing mechanism may be stopped by any suitable means, not shown.

Figure 8:
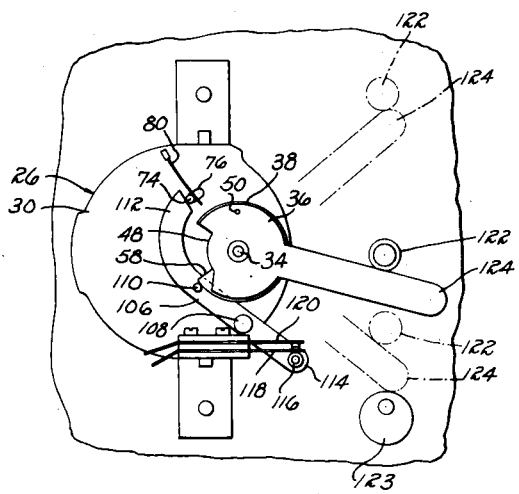
Fig. 8 is a fragmentary vertical elevation of still another embodiment of mechanism operable by an interval timer mechanism embodying the principles of the present invention.

In Fig. 8, there is illustrated a still further example of mechanism with which the principles of the timing mechanism comprising the present invention may be employed. In Fig. 8, there is shown a lever 106 pivoted at 108 for example to the rear frame plate 30, of the timing mechanism, said lever having a pin 110 which coacts with the timing discs 36 and 38 thereof. Lever 106 corresponds to levers 100 and 40 of the two embodiments of the invention described hereinabove and the control of the movement of the lever 106 is similar to the control of movement of levers 40 and 100.

When, for example, the zero setting of the timer is reached by the setting knob on arbor 34 of the mechanism in Fig. 8, the pin 110 will drop off of the radial edge 58 of disc 38 and cause the upper end 112 of lever 106 to be moved clockwise in order to shift the movable bearing 74 in a direction to disengage the pallet member 68 from the escape wheel 66. As in the embodiment shown in Figs. 6 and 7, the mechanism shown in Fig. 8 preferably does not include the retarding member 60 in the embodiment as shown in Figs. 1 through 5. Thus when the pallet member 68 is disengaged from the escape wheel of the mechanism shown in Fig. 8, the time train will then run free of any retarding effect of the pallet member and such movement will be at a very rapid rate to impart rapid movement to the timing disc 36 while moving in counter-clockwise direction as viewed in Fig. 8.

Fixed to the lower end 114 of the lever 106 is a projection 116 which engages a movable switch member or blade 118. During the operation of the timing mechanism while moving from a predetermined setting to zero, the lever 106 will maintain the switch contact of movable blade 118 of the switch in engagement with the contact of fixed blade 120 thereof in order to maintain the switch closed. However, when the zero setting is reached and the lever 106 is shifted clockwise to disengage the pallet member from the escape wheel, the lower end 114 will also cause the projection 116 to move so as to effect a disengagement between the switch contacts of blades 118 and 120 of the switch so as to break the circuit of any mechanism appliance with which the timing mechanism may be used, such as, for example, a toaster.

The particular exemplary illustration shown in Fig. 8 is a fragmentary portion of a so-called pop-up type toaster wherein the depressing knob 122 may be moved from its starting position shown in dotted lines in the upper portion of the figure to the dotted line position thereof shown in the lower portion of the figure in order to effect a setting of time during which the toaster is to operate. A stop comprising an adjustable eccentric 123 is provided if desired to control the limit of the initial setting of the timing mechanism. Downward movement of the knob 122 will cause arm 124, fixed to disc 36 to be moved from its initial dotted line position shown in the upper part of Fig. 8 to the set position thereof shown in dotted lines in the lower part of Fig. 8. In the latter position, the end of arm 124 engages the adjustable stop 123.

When the timer is moving in the timing direction, counter-clockwise as viewed in Fig. 8, the arm 124 will gradually move upward and slowly carry knob 122 therewith until the pin 110 of lever 106 drops off the corner of disc 38 defined by radial edge 58. This corresponds to the zero setting of the timer and opens the switch contacts to break the heating circuit of the toaster. Such movement of the arm 106 will, as stated above, disengage the pallet member 68 from the escape wheel and will thereafter permit the mechanism to run free from impedance by the pallet member and cause the timing disc 36 to move very rapidly in counter-clockwise direction, carrying the arm 124 thereof upward at a rapid rate of speed. Arm 124 will also move the knob 122 upward in a rapid manner. Assuming that the knob 122 is connected to the carriage which holds and causes a slice of toast to pop up relative to the toaster, the mechanism described in Fig. 8 may be utilized to effect such upward movement of the carriage for the slice of toast. The mechanism will be permitted to run sufficiently long to move the arm 124 to the upper dotted line position in Fig. 8, and then stopped by any suitable means.

While the invention has been illustrated and described in its preferred embodiment and has included certain details, it should be understood that the invention is not to be limited to the precise details herein illustrated and described since the same may be carried out in other ways, falling within the scope of the invention as claimed.

We claim as our invention:

1. A dual range timing device comprising in combination, a single time train, power means to drive said train in a single predetermined direction, mechanism comprising an escape wheel and pallet member associated with said time train and operable to cause it to be driven at one rate of speed for a desired predetermined period of time, said pallet member being movably mounted for movement into and out of engagement with the escape wheel, settable means movable in setting direction to determine said period of time, said settable means being driven oppositely in timing direction by said time train, and means actuated by the settable means and engageable with the pallet member when said settable means reaches a specific position during its movement in timing direction to cause said pallet member to be moved from engagement with said escape wheel, whereby said time train operates thereafter at a faster rate of speed during continued movement of said settable means in timing direction.

2. A dual range interval timer comprising in combination, a single time train, power means to drive said train in a single predetermined direction, means settable to determine the total period of time during which the time train shall operate, speed regulating mechanism associated with said time train and operable to cause it to be driven at a fast rate of speed during a first range of settings to measure a selected relatively short interval of time, a second speed regulating mechanism movable into engagement with the time train to cause the time train to be driven at a slower rate of speed, and means automatically operable when a predetermined position in the range of movement of the settable means is reached to engage said second speed regulating mechanism with the time train to cause said time train to be driven at a slower rate of speed during a second range of settings while measuring a selected interval of time in excess of the maximum of said short intervals.

3. A dual range interval timer comprising in combination, a single time train, power means to drive said train in a single predetermined direction, means settable to determine the total period of time during which the time train shall operate, speed regulating mechanism associated with said time train and operable to cause it to be driven at a fast rate of speed during a first range of settings to measure a selected relatively short interval of time, a second speed regulating mechanism normally engaging with the time train to cause it to be driven at a slower rate of speed, a timing disc driven by said time train, and a lever controlled by said disc and movable automatically when a predetermined position in the range of movement of the settable means and timing disc is reached to disengage said second speed regulating mechanism and cause said time train to be driven at a slower rate of speed during a second range of settings while measuring a selected interval of time in excess of the maximum of said short intervals.

4. A dual range interval timer comprising in combination, a single time train, power means to drive said train in a single predetermined direction, means settable to determine the total period of time during which the time train shall operate, an escape wheel associated with the time train, a first pallet member continuously engaging the escape wheel to cause the time train to be driven at a fast rate of speed during a first range of settings to measure a selected relatively short interval of time, a second pallet member movable into engagement with the escape wheel to cause the time train to be driven at a slower rate of speed and means automatically operable when a predetermined position in the range of movement of the settable means is reached to engage said second pallet member with said escape wheel and cause said time train to be driven at a slower rate of speed during a second range of settings while measuring a selected interval of time in excess of the maximum of said short intervals.

5. A dual range interval timer comprising in combination, a time train, power means to drive said train, means settable to determine the total period of time during which the time train shall operate, speed regulating mechanism comprising an escape wheel and pallet member associated with said time train, a timing disc driven by said time train and a lever controlled by said disc and operable to maintain the pallet member disengaged from the escape wheel and cause the time train to be driven at a fast rate of speed during a first range of settings to measure a selected relatively short interval of time, said disc and lever being automatically operable when a predetermined position in the range of movement of the settable means and disc is reached to engage said pallet member with said escape wheel and cause said time train to be driven at a slower rate of speed during a second range of settings while measuring a selected interval of time in excess of the maximum of said short intervals.

6. A dual range interval timer comprising in combination, a time train, power means to drive said train, means settable to determine the total period of time during which the time train shall operate, speed regulating mechanism comprising an escape wheel and a first pallet member associated with said time train and operable to maintain the pallet member disengaged from the escape wheel and cause the time train to be driven at a fast rate of speed during a first range of settings to measure a selected relatively short interval of time, a second pallet member normally engaging said escape wheel to control the speed of said train while running at said fast rate, and means automatically operable when a predetermined position in the range of movement of the settable means is reached to engage said first pallet member with said escape wheel and cause said time train to be driven at a slower rate of speed during a second range of settings while measuring a selected interval of time in excess of the maximum of said short intervals.

7. A dual range timing device comprising in combination, a time train, power means to drive said train, mechanism comprising an escape wheel and pallet member associated with said time train and operable to cause it to be driven at a predetermined rate of speed for a desired period of time, said pallet member being mounted for movement into and out of engagement with said escape wheel, settable means operable to determine said period of time, and means operated by said time train and engageable with the pallet member when said period has elapsed to disengage said pallet member from the escape wheel to permit said time train to operate thereafter free from the retarding effect of said escapement and at a greatly increased rate of speed.

MERRITT VAN VALKENBURGH.
LAWRENCE J. LAVIANA.

REFERENCES CITED

The following references are of record in the file of this patent:

UNITED STATES PATENTS

| Number | Name | Date |
|---|---|---|
| 368,814 | Conant | Aug. 23, 1867 |
| 967,304 | Bailey | Aug. 16, 1910 |
| 1,919,255 | Porter | July 25, 1933 |
| 2,050,614 | Kerr | Aug. 11, 1936 |
| 2,060,833 | Smith | Nov. 17, 1936 |
| 2,106,042 | Stark | Jan. 18, 1938 |